United States Patent [19]

Gneuss

[11] Patent Number: 5,449,458
[45] Date of Patent: Sep. 12, 1995

[54] FILTER SYSTEM FOR MOLTEN PLASTIC

[75] Inventor: Detlef Gneuss, Bad Oeynhausen, Germany

[73] Assignee: Gneuss Kunststofftechnik GmbH, Oeynhausen, Germany

[21] Appl. No.: 50,914

[22] Filed: Apr. 20, 1993

[30] Foreign Application Priority Data

Apr. 21, 1992 [DE] Germany ............ 42 12 928.1

[51] Int. Cl.⁶ ................................ B01D 33/00
[52] U.S. Cl. .................. 210/330; 210/323.2; 210/345; 210/346; 210/488
[58] Field of Search .......... 210/330, 193, 345, 323.2, 210/333.1, 346, 488; 425/197

[56] References Cited

U.S. PATENT DOCUMENTS

| | | | |
|---|---|---|---|
| 3,493,113 | 2/1970 | Rosaen | 210/330 |
| 3,971,721 | 7/1976 | Fogarty, Jr. | 210/401 |
| 4,046,359 | 9/1977 | Gellert | 210/488 |
| 4,543,184 | 9/1985 | Hoffmann et al. | 210/330 |
| 4,619,600 | 10/1986 | Gneuss | 425/197 |
| 4,710,288 | 12/1987 | Patrovsky | 210/359 |
| 4,793,928 | 12/1988 | Tsukamoto et al. | 210/544 |
| 4,814,081 | 3/1989 | Malinowski | 210/510.1 |
| 4,935,126 | 6/1990 | Drori | 210/492 |
| 5,200,077 | 4/1993 | McNeice et al. | 210/330 |

FOREIGN PATENT DOCUMENTS

| | | |
|---|---|---|
| 3341508C1 | 12/1984 | Germany . |
| 3522050C1 | 10/1986 | Germany . |
| 3443654C2 | 6/1987 | Germany . |
| 4113501 | 10/1992 | Germany . |
| 0019010 | 1/1985 | Japan ............ 210/330 |

OTHER PUBLICATIONS

"Filtration of Plastics Melts" Filtration System Gneuss, Detlef Gneus pp. 1–36 (booklet), 1988.

*Primary Examiner*—Virginia Manoharan
*Attorney, Agent, or Firm*—Herbert Dubno; Andrew Wilford

[57] ABSTRACT

An inlet plate is normally connected to an extruder and formed with an inlet port for supplying a molten synthetic resin under pressure to the port and an outlet plate is normally connected to or part of a mold and is formed with an outlet port in line with and confronting the inlet port for receiving the molten synthetic resin. A movable filter support engageable snugly between the plates at the ports thereof is formed with at least two laterally offset cavities each having an inlet side against the inlet plate and an outlet side against the outlet plate. This support element can be displaced between at least two respective positions in each of which one of the cavities is aligned between the ports for flow through the one cavity therebetween. A respective filter unit in each of the cavities has a plurality of separate cells each having an outside exposed to flow from one of the ports and an inside exposed to the other of the ports.

16 Claims, 3 Drawing Sheets

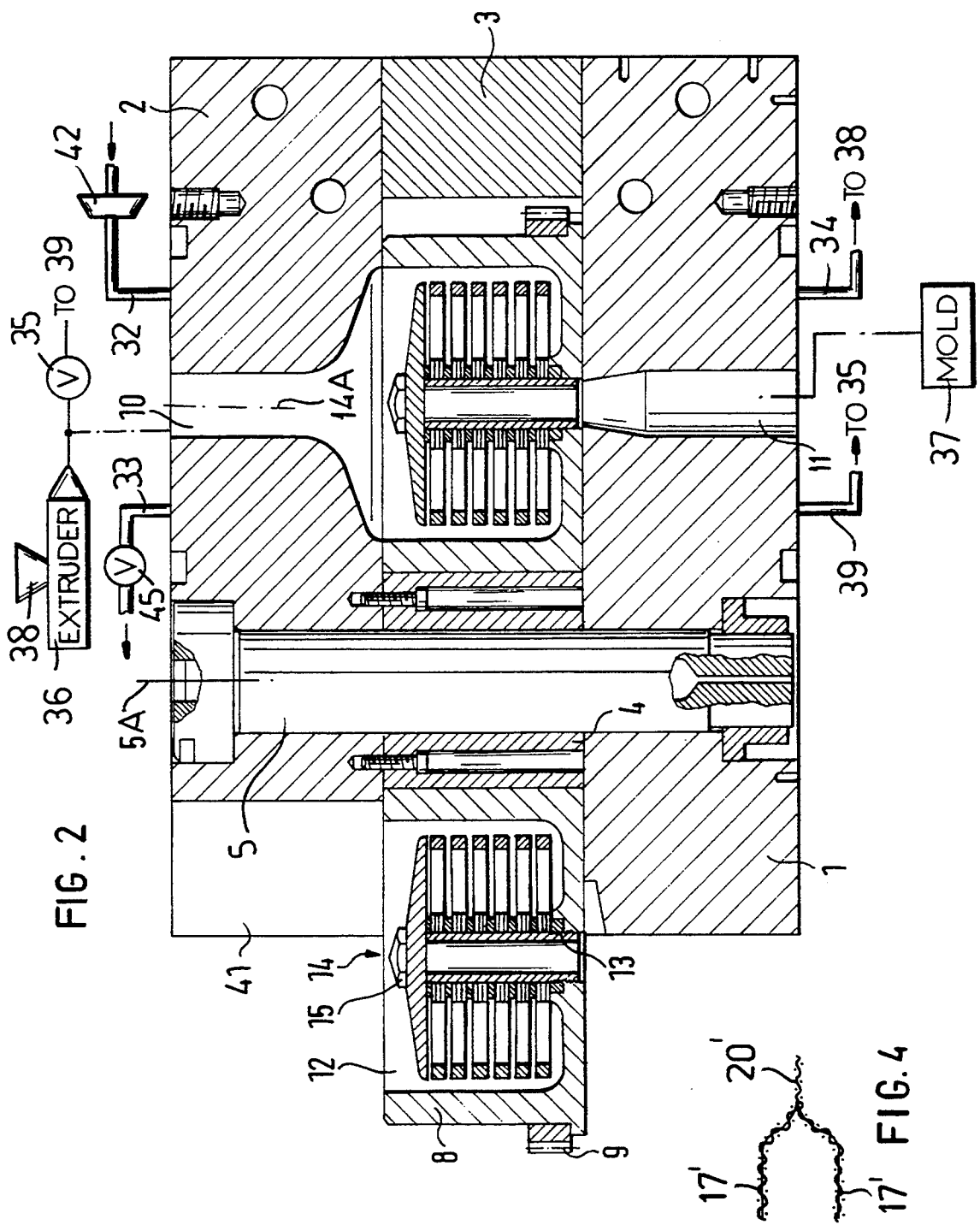

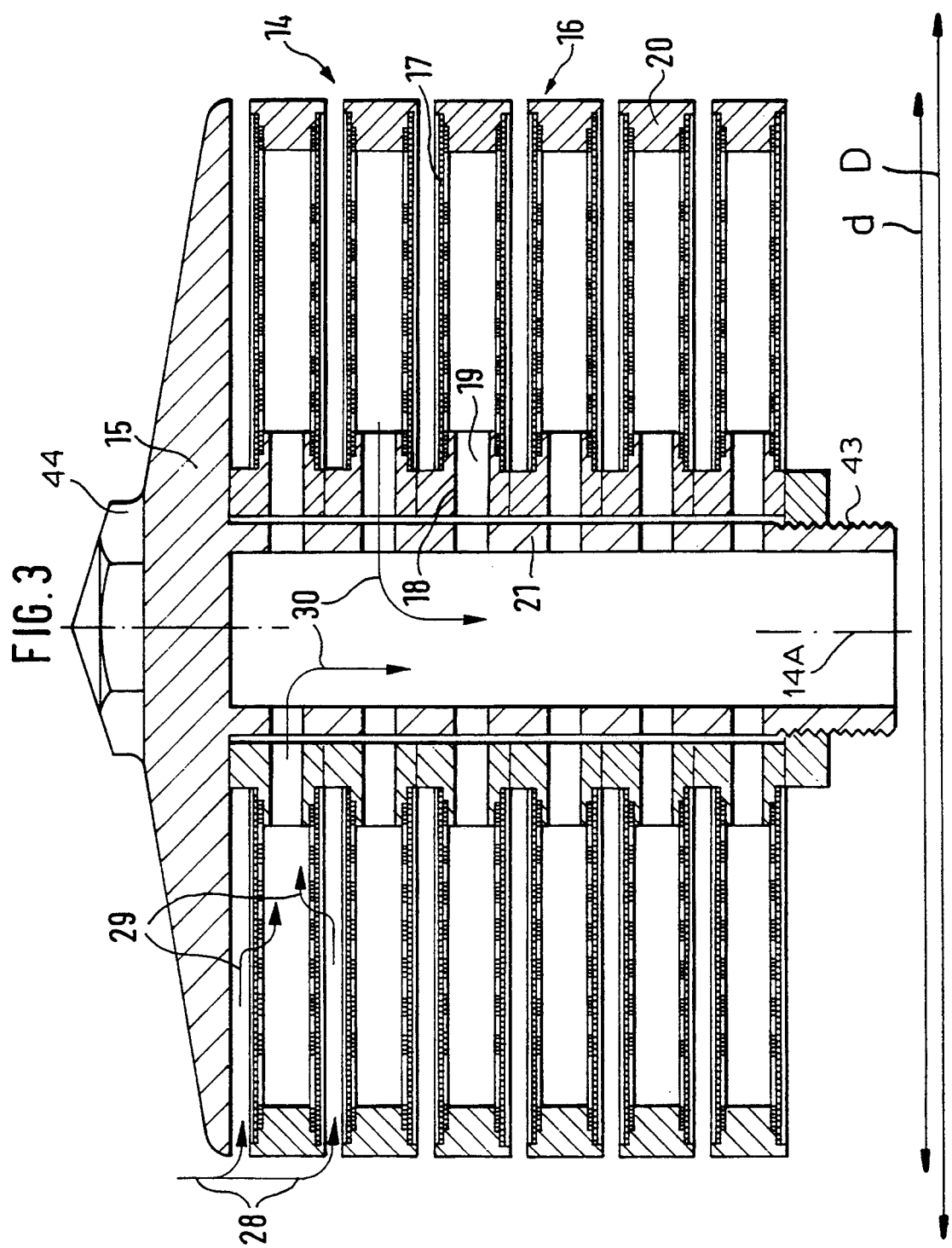

FILTER SYSTEM FOR MOLTEN PLASTIC

SPECIFICATION

1. Field of the Invention

The present invention relates to a filter system for a molten synthetic resin. More particularly this invention concerns a filter interposed between an extruder and a mold.

2. Background of the Invention

As described in the in-house publication "Filtration of Plastics Melts" of Gneuss Kunststofftechnik GmbH, it is standard to pass a molten plastic through a filter between the extruder that heats and liquefies the plastic and a mold where the plastic is to harden into a molded article. In this manner it is possible to eliminate unwanted particles and the like from the flow exiting the extruder, something that is a particular problem when the starting material is a recycled resin.

As also described in German patent document 4,113,501 filed 25 Apr. 1991 a filter disk is rotatable about an axis and carries a plurality of filters that are spaced angularly from each other. This disk is engaged between an intake plate or member formed with a port connected to the extruder and an outlet plate or member formed with a port aligned with the intake port. The disk can be angularly indexed through positions in each of which one of the filters is aligned between the ports and another of the filters is exposed outside the machine. Thus at any time the melt is forced through the one filter while the other filters can be cleaned or otherwise serviced or replaced. As soon as the filter between the ports starts to clog and reduce flow excessively, the disk is indexed angularly to bring a fresh filter into the working position.

The main problem with such an arrangement is that space constraints require that fairly small filters be used. Thus the filters clog rapidly and the machine must change them often. Another problem with the known systems is that when a filter is changed there is usually a dramatic change in resistance to flow, so that the next workpiece is frequently spoiled, and also a certain amount of air is introduced into the system, also ruining the next workpiece.

OBJECTS OF THE INVENTION

It is therefore an object of the present invention to provide an improved filter system for a plastic melt.

Another object is the provision of such an improved filter system for a plastic melt which overcomes the above-given disadvantages, that is which has filters of sufficiently large surface area or capacity that the machine can go a relatively long time between filter changes.

A further object is to provide an improved method of operating such a system where on filter change pressure fluctuations are avoided and air is not introduced into the melt stream.

SUMMARY OF THE INVENTION

The instant invention is used with an inlet plate normally connected to an extruder and formed with an inlet port for supplying a molten synthetic resin under pressure to the port and an outlet plate normally connected to or part of a mold and formed with an outlet port in line with and confronting the inlet port for receiving the molten synthetic resin. A movable filter support engageable snugly between the plates at the ports thereof is formed with at least two laterally offset cavities each having an inlet side against the inlet plate and an outlet side against the outlet plate. This support element can be displaced between at least two respective positions in each of which one of the cavities is aligned between the ports for flow through the one cavity therebetween. A respective filter unit in each of the cavities has a plurality of separate cells each having an outside exposed to flow from one of the ports and an inside exposed to the other of the ports.

More particularly, the individual filters each include a support body having a hollow interior open to one of the sides of the cavity and formed with at least two axially spaced annular ridges and with a respective radially throughgoing passage extending from each ridge to the interior, and a respective pair of foraminous filter-medium disks having inner peripheries flanking and engaging the respective ridge and outer peripheries that are connected together. Each pair of disks forms with the respective ridge a respective filter cell having a hollow interior into which the respective passage opens.

Thus with this system the total effective surface area of the filter can be many times greater than the flow cross section of the cavity through which the molten-plastic stream passes. The effective and useful life of the filter is therefore greatly increased.

According to the invention the filter disks of each pair are bonded directly with each other. Normally they are generally planar and have outer peripheries that are bent inward and bonded together. It is also possible for each filter to have respective rings engaged between the outer peripheries of each pair of filter disks. Each filter disk is formed of at least two different foraminous layers, a downstream layer of filter medium and an upstream protective layer. Furthermore each filter disk is planar and the inner and outer peripheries are substantially circular. The filter body has a disk-like head of an outside diameter equal generally to an outside diameter of the disks at the outer peripheries thereof. The head of the body is axially closely spaced with a one of the filter disks.

The cavities according to the invention are each formed as a pocket open axially toward one of the plates and having a central hole open toward the other plate. The body is attached in the respective pocket and is removable axially therefrom. Each body is threaded into the respective hole of the respective pocket.

In accordance with the invention the filter element is formed with at least three such cavities each provided with a single such filter assembly and spaced apart in the direction. Each of the ports is dimensioned sufficiently long in the direction that it can cover two of the cavities for simultaneous flow through two of the filter assemblies. Normally the direction is basically circular and the filter element is pivotal about an axis on the input and output plates. Furthermore according to the invention means is provided in at least one of the plates downstream in the direction from the ports for evacuating molten plastic from a cavity downstream of the ports. This evacuating mean feeds a gas under pressure to the cavity downstream of the port and drains the molten plastic therefrom. Thus before the assembly gets to the location where it is cleaned or replaced, it is emptied, thereby making working on it less messy and saving the valuable resin.

Furthermore according to the invention means is provided in at least one of the plates upstream in the direction from the ports for filling molten plastic into a cavity upstream of the ports. This filler means introduces molten plastic into the cavity upstream of the ports and evacuates gas from it. The gas is evacuated through a valve that maintains a superatmospheric pressure in the cavity upstream of the port. Thus with this system when a new filter assembly is inserted into the system, it is already full and no air is introduced into the flow.

BRIEF DESCRIPTION OF THE DRAWING

The above and other objects, features, and advantages will become more readily apparent from the following, reference being made to the accompanying drawing in which:

FIG. 2 is a partly diagrammatic sectional view taken along line II—II of FIG. 1;

FIG. 3 is a large-scale axial section through the filter of the system of the invention; and FIG. 4 is a large-scale view of a detail of a variant on the structure of FIG. 3.

SPECIFIC DESCRIPTION

Figure 1:
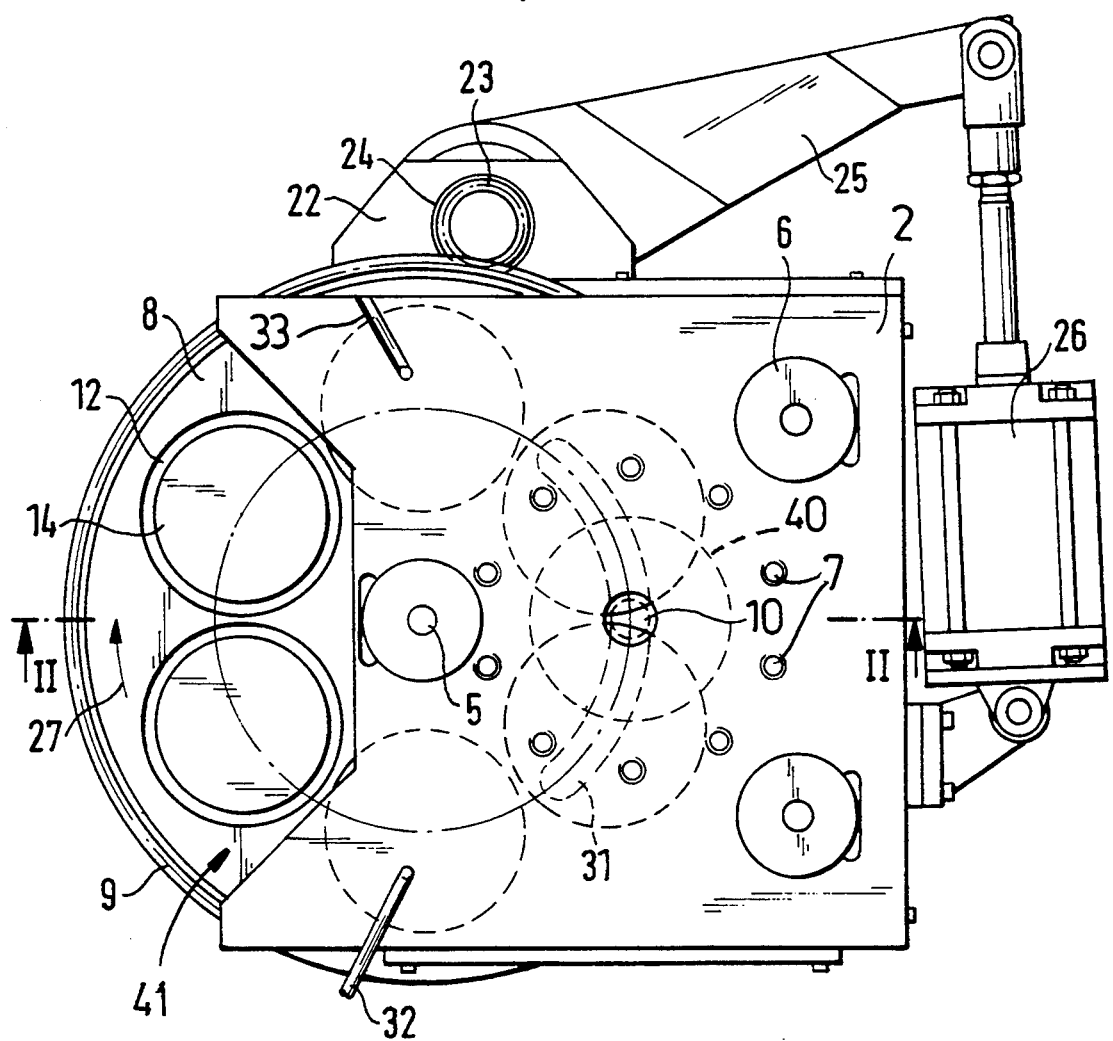
FIG. 1 is a top view of the filter system of this invention.

As seen in FIG. 1 a thick output plate 1 is positioned underneath a thick input plate 2, with spacers 3 and 4 holding the plates 1 and 2 parallel to each other and spaced apart and bolts 5, 6, and 7 retaining them solidly with respect to each other. The input plate 2 is formed with an inlet port 10 connected to the output of an extruder shown diagrammatically at 36 and having an input hopper 38 and the outlet plate 1 is formed with an outlet port 11 connected to a mold shown diagrammatically at 37. The inlet port 10 is widened at the planar lower face of the plate 2 to a large-diameter circular mouth indicated at 40 in FIG. 1 and the outlet port 11 is widened as an arcuate groove shown at 31 that has a center of curvature at an axis 5A of the bolt 5.

According to the invention a filter element or disk 8 of basically cylindrical shape is centered on the axis 5A and rotatable thereabout on the spacer 4 surrounding the bolt 5. It is formed with six angularly equispaced and upwardly open generally cylindrical pockets 12 of an inside diameter D (See FIG. 3.) each centrally formed with an internally threaded hole 13. The angular spacing of the equispaced pockets 12 and holes 13 is such that at any time the circular mouth 40 of the inlet port 10 overlies two of the pockets 12 and the outlet slot or groove 31 communicates with two of the holes 13.

The outer edge of the filter disk 8 is formed with a peripheral row 9 of gear teeth that mesh with a gear 23 journaled in a mount 22 on the plate 1 and coupled via a one-way clutch 24 to an arm 25 whose outer end is connected to the piston rod of a double-acting ram 26. The stroke of the ram 26 is such that each time it extends its piston rod, it angularly displaces the lever 25 enough to move the disk 8 about the axis 5A through 60°, that is one sixth of a revolution. This advances one of the pockets 12 from out of communication with the ports 10 and 11 and another of the pockets 12 into such communication, while at the same time aligning two adjacent but opposite pockets 12 with a lateral service cutout 41 formed in the upper plate 2.

As also shown in FIG. 3, each pocket 12 houses a respective filter subassembly or unit 14 centered on an axis 14A, having an outside diameter d slightly smaller than the cavity diameter D, and comprised of a tubular filter body 21 having a lower threaded end 43 that is normally screwed into the respective internally threaded hole 13 and a top 15 formed as a cover disk having a central hexagonal bump 44 making it possible to use a wrench on the filter 14 to screw it into or out of the respective hole 13. The tubular body 21 is formed with six axially spaced and radially outwardly projecting ridges 18 of rectangular section and between the ridges 18 with radially throughgoing holes 19.

Twelve axially spaced circularly annular filter disks 17 each formed by a stiff mesh layer overlain by a finer-mesh filter medium each have an inner periphery secured to an upper or lower edge of a respective ridge and an outer periphery similarly secured to an upper or lower edge of a respective ring 20. Thus each pair of such disks 17 forms with the respective ridge 18 and the respective ring 20 a filter cell 16 having a pair of axially oppositely directed outer faces. Clearly the total effective surface area of the filter unit 14 is equal to about twelve times the area of one of the disks 17, so that this total area is very large even through the filter unit 14 is relatively compact.

FIG. 4 shows how, instead of using a ring 20, the outer peripheries of two of the two-layer filter disks 17' are bent together and glued, soldered, or otherwise fused together at 20'. This construction makes the filter a little cheaper to manufacture.

In use a molten synthetic resin flows under considerable pressure from the extruder 36 into the port 10 and thence into its widened mouth area 40. It then flows into the two pockets 12 that are underneath this mouth area 40 and enters the interstices between the cells 16 as illustrated by the arrow 28 in FIG. 3. Then the plastic stream flows through the walls of the cells 16 as illustrated by the arrows 29 into the interiors of the cells 16, whence it flows through the holes 19 as indicated by the arrow 30 into the interior of the filter body 21. Thereafter the flows move out the holes 13 into the groove 31, are united in the outlet port 11, and flow into the mold 37.

Once the filter cells 16 start to clog, which is easy to determine by measuring the differential between the pressures in the ports 10 and 11, the actuator 26 is operated to angularly index the filter plate 8 through 60° in the direction of arrow 27 of FIG. 1. This action moves a fresh filter 14 into communication between the two ports 10 and 11 and moves out the more clogged of the two previously active filters 14. Since only one of the two filters is being switched, the pressure variation will not be significant, will in fact be much smaller than in the prior-art systems where a clogged filter was replaced with a completely fresh one.

In addition according to this invention the housing 1, 2, 3 is formed downstream in the direction 27 from the active zone defined by the mouth 40 and groove 31 with a top-side conduit 32 connected to the output of a pressurized-air source 42 and a bottom-side exhaust conduit 34 that feeds back to the feed hopper 38 of the extruder 36. Thus as a filter 14 moves out of the active zone, the liquid plastic in it is blown down out of the respective pocket 12 and is recycled to the extruder 38. This means that by the time the filter 14 has moved to the service notch 41, it is substantially empty so that working on it is not messy, and the valuable resin is not wasted.

In addition immediately upstream of the active zone the housing 1, 2, 3 is provided with a top-side conduit 33 opening via a relief valve 45 to the atmosphere and to a bottom-side feed conduit 39 connected via a pressure-reducing valve 35 to the output of the extruder 36. Thus when a filter 14 moves into the next-in-line position immediately upstream of the active zone, liquefied plastic is introduced into it under slightly superatmospheric pressure while air in it is allowed to bleed out the top until the liquid plastic hits the valve 45 which then closes, maintaining the charge in the just filled filter 14 under pressure. This filter is then fully filled with the melt so that when it is moved into the active position, a big bubble of air is not introduced into the system, with the attendant pressure fluctuation and other problems.

I claim:

1. A multiple filter system for connection to a source of a molten synthetic resin under superatmospheric pressure, the system comprising:

an inlet plate formed with an inlet port connected to the source and opening at a downstream face of the plate;

an outlet plate spaced from the inlet plate and formed with an outlet port in line with the inlet port;

a movable filter support element formed with at least three cavities each having an upstream side open toward the inlet plate and a downstream side open toward the outlet plate;

means for displacing the support element in a predetermined direction between a plurality of positions in each of which a respective one of the cavities is aligned between the ports for flow of the resin from the inlet port through the respective cavity to the outlet port; and respective filter assemblies each centered in a respective one of the cavities on a respective axis and each including a support body having a hollow interior open to one of the sides of the cavity and formed with at least two axially spaced annular ridges and with a respective radially throughgoing passage extending from each ridge to the interior, each of the ports being dimensioned sufficiently long in the direction that it can cover two of the cavities for simultaneous flow through two of the filter assemblies, and a plurality of respective pairs of generally parallel foraminous filter-medium disks having inner peripheries flanking and engaging the respective ridges and outer peripheries that are connected together, and a respective filter cell formed by each pair of disks with the respective ridge, each filter cell having a hollow interior into which the respective passage opens.

2. The filter system defined in claim 1 wherein the filter disks of each pair are bonded directly with each other.

3. The filter system defined in claim 2 wherein the disks are generally planar and have outer peripheries that are bent inward and bonded together.

4. The filter system defined in claim 1 wherein each filter assembly includes respective rings engaged between the outer peripheries of each pair of filter disks.

5. The filter system defined in claim 1 wherein each filter disk is formed of at least two different foraminous layers.

6. The filter system defined in claim 1 wherein each filter disk is planar and the inner and outer peripheries are substantially circular.

7. The filter system defined in claim 6 wherein the filter body has a disk-like head of an outside diameter equal generally to an outside diameter of the disks at the outer peripheries thereof.

8. The filter system defined in claim 7 wherein the head of the body is axially closely spaced with a one of the filter disks.

9. The filter system defined in claim 1 wherein the cavities are each formed as a pocket open axially toward one of the plates and having a central hole open toward the other plate, the body being attached in the respective pocket and being removable axially therefrom.

10. The filter system defined in claim 9 wherein each body is threaded into the respective hole of the respective pocket.

11. The filter system defined in claim 1 wherein the direction is basically circular, the filter element being pivotal about an axis on the input and output plates.

12. The filter system defined in claim 11, further comprising means in at least one of the plates downstream in the direction from the ports for evacuating molten plastic from a cavity downstream of the ports.

13. The filter system defined in claim 12 wherein the evacuating means includes conduit means for feeding a gas under pressure to the cavity downstream of the port and for draining the molten plastic therefrom.

14. The filter system defined in claim 11, further comprising means in at least one of the plates upstream in the direction from the ports for filling molten plastic into a cavity upstream of the ports.

15. The filter system defined in claim 14 wherein the filling means includes means for introducing molten plastic into the cavity upstream of the ports and for evacuating gas from it.

16. The filter system defined in claim 15 wherein the means for evacuating gas includes valve means for maintaining a superatmospheric pressure in the cavity upstream of the port.

* * * * *